(12) United States Patent
Sorensen et al.

(10) Patent No.: US 11,338,415 B2
(45) Date of Patent: May 24, 2022

(54) GUIDANCE DEVICE AND METHOD FOR INSTALLING FLANGES

(71) Applicant: CUMULUS DIGITAL SYSTEMS, INC., Cambridge, MA (US)

(72) Inventors: Paul Sorensen, Cambridge, MA (US); Angela Ann Ackroyd, Cambridge, MA (US); Angela Nagelin, Cambridge, MA (US); Meghan Golden, Cambridge, MA (US); Chiz Chikwendu, Cambridge, MA (US)

(73) Assignee: CUMULUS DIGITAL SYSTEMS, INC., Cambridge, MA (US)

( * ) Notice: Subject to any disclaimer, the term of this patent is extended or adjusted under 35 U.S.C. 154(b) by 62 days.

(21) Appl. No.: 16/820,133

(22) Filed: Mar. 16, 2020

(65) Prior Publication Data

US 2020/0215670 A1 Jul. 9, 2020

Related U.S. Application Data

(62) Division of application No. 15/248,415, filed on Aug. 26, 2016, now Pat. No. 10,589,406.

(51) Int. Cl.
*B25B 23/14* (2006.01)
*B25B 21/00* (2006.01)
(Continued)

(52) U.S. Cl.
CPC ............. *B25B 23/14* (2013.01); *B25B 21/00* (2013.01); *B25B 23/00* (2013.01); *G09B 19/24* (2013.01)

(58) Field of Classification Search
CPC .......... B25B 23/00; B25B 21/00; G09B 19/24
See application file for complete search history.

(56) References Cited

U.S. PATENT DOCUMENTS 6,234,051 B1 * 5/2001 Bareggi .............. B25B 23/0035
73/862.21
6,843,628 B1 * 1/2005 Hoffmeister ..... G06K 19/06009
411/14

(Continued)

FOREIGN PATENT DOCUMENTS

CN        204818666 U    12/2015
DE    102008016925 A1    10/2009

(Continued)

OTHER PUBLICATIONS

International Search Report in corresponding PCT/EP2017/071408, dated Jan. 3, 2018.

(Continued)

*Primary Examiner* — Rick K Chang
(74) *Attorney, Agent, or Firm* — Lando & Anastasi, LLP

(57) ABSTRACT

The invention relates to a guidance device for guiding a worker through a process of installing flanges by fastening a plurality of bolts with a torque wrench. The guidance device is arranged to communicate with the torque wrench and the worker via a user interface. The guidance device is arranged to
    a) obtain flange information about a flange to be installed, the flange information comprising a required torqueing pattern of the bolts to be fastened and required torque values,
    b) output via the user interface of an indication of a first bolt of the required torqueing pattern,
    c) receive an applied torque value from the torque wrench,
    d) output via the user interface of an indication of a next bolt of the required torqueing pattern,
    repeat c) and d) until a last applied torque value is received and (Continued)

e) transmit a torque record to a remote computer or data storage.

8 Claims, 1 Drawing Sheet

(51) Int. Cl.
*B25B 23/00* (2006.01)
*G09B 19/24* (2006.01)

(56) References Cited

U.S. PATENT DOCUMENTS

| | | | | |
|---|---|---|---|---|
| 7,182,147 | B2 * | 2/2007 | Cutler | B25B 21/00 |
| | | | | 173/1 |
| 7,613,590 | B2 * | 11/2009 | Brown | G16H 10/20 |
| | | | | 702/188 |
| 7,984,657 | B2 | 7/2011 | DeRose et al. | |
| 8,485,075 | B1 * | 7/2013 | Gauthier | A61B 17/8875 |
| | | | | 81/479 |
| 8,519,558 | B2 * | 8/2013 | Leininger | B25F 5/021 |
| | | | | 290/54 |
| 8,549,932 | B1 * | 10/2013 | Schultz | G01M 5/0058 |
| | | | | 73/862.21 |
| 8,584,957 | B2 * | 11/2013 | Zhu | F16B 31/02 |
| | | | | 235/492 |
| 8,646,339 | B2 * | 2/2014 | Smith | B25B 23/14 |
| | | | | 73/862.338 |
| 8,676,368 | B2 * | 3/2014 | Stencel | B25B 23/14 |
| | | | | 700/108 |
| 8,683,869 | B2 * | 4/2014 | Herley | F16B 31/02 |
| | | | | 73/761 |
| 8,763,469 | B2 * | 7/2014 | Knoop | B25B 21/00 |
| | | | | 73/761 |
| 8,857,532 | B2 * | 10/2014 | Wallgren | B25B 23/14 |
| | | | | 173/1 |
| 9,126,317 | B2 * | 9/2015 | Lawton | B25B 23/14 |
| 9,157,818 | B2 * | 10/2015 | Schultz | G01L 3/10 |
| 9,329,594 | B2 * | 5/2016 | Rataul | G05B 19/4188 |
| 9,483,674 | B1 * | 11/2016 | Fink | G06K 7/10366 |
| 9,700,978 | B2 * | 7/2017 | DeLand et al. | B23Q 5/08 |
| 9,823,649 | B2 * | 11/2017 | Sahadeo | G05B 19/4183 |
| 9,878,428 | B2 * | 1/2018 | Lehnert | B25F 5/00 |
| 9,964,135 | B2 * | 5/2018 | Jaffrey | F16B 31/028 |
| 10,055,623 | B2 * | 8/2018 | Chu | F16B 1/0071 |
| 2008/0115636 | A1 | 5/2008 | DeRose et al. | |
| 2011/0023071 | A1 | 1/2011 | Li et al. | |
| 2011/0023280 | A1 | 2/2011 | Renke | |
| 2014/0009305 | A1 * | 1/2014 | Schultz | B25B 23/14 |
| | | | | 340/870.01 |
| 2014/0226810 | A1 | 8/2014 | Steiner et al. | |
| 2014/0336810 | A1 | 11/2014 | Li et al. | |
| 2015/0209927 | A1 * | 7/2015 | DeLand | B23Q 5/08 |
| | | | | 408/1 R |

FOREIGN PATENT DOCUMENTS

| | | |
|---|---|---|
| EP | 2602682 A1 | 6/2013 |
| EP | 2722132 A2 | 4/2014 |
| GB | 2486658 A | 6/2012 |
| GB | 2508090 A | 5/2014 |
| GB | 2511591 A | 9/2014 |
| GB | 2514264 A | 11/2014 |
| JP | 2000111450 A | 4/2000 |
| JP | 2011240425 A | 12/2011 |
| JP | 2015196231 A | 11/2015 |
| KR | 20110054491 A | 5/2011 |
| WO | 201128362 A1 | 3/2011 |
| WO | 201399373 A1 | 7/2013 |
| WO | 201434194 A1 | 3/2014 |

OTHER PUBLICATIONS

Written Opinion, Singapore Application No. 11201901643Q, dated Feb. 13, 2020.

\* cited by examiner

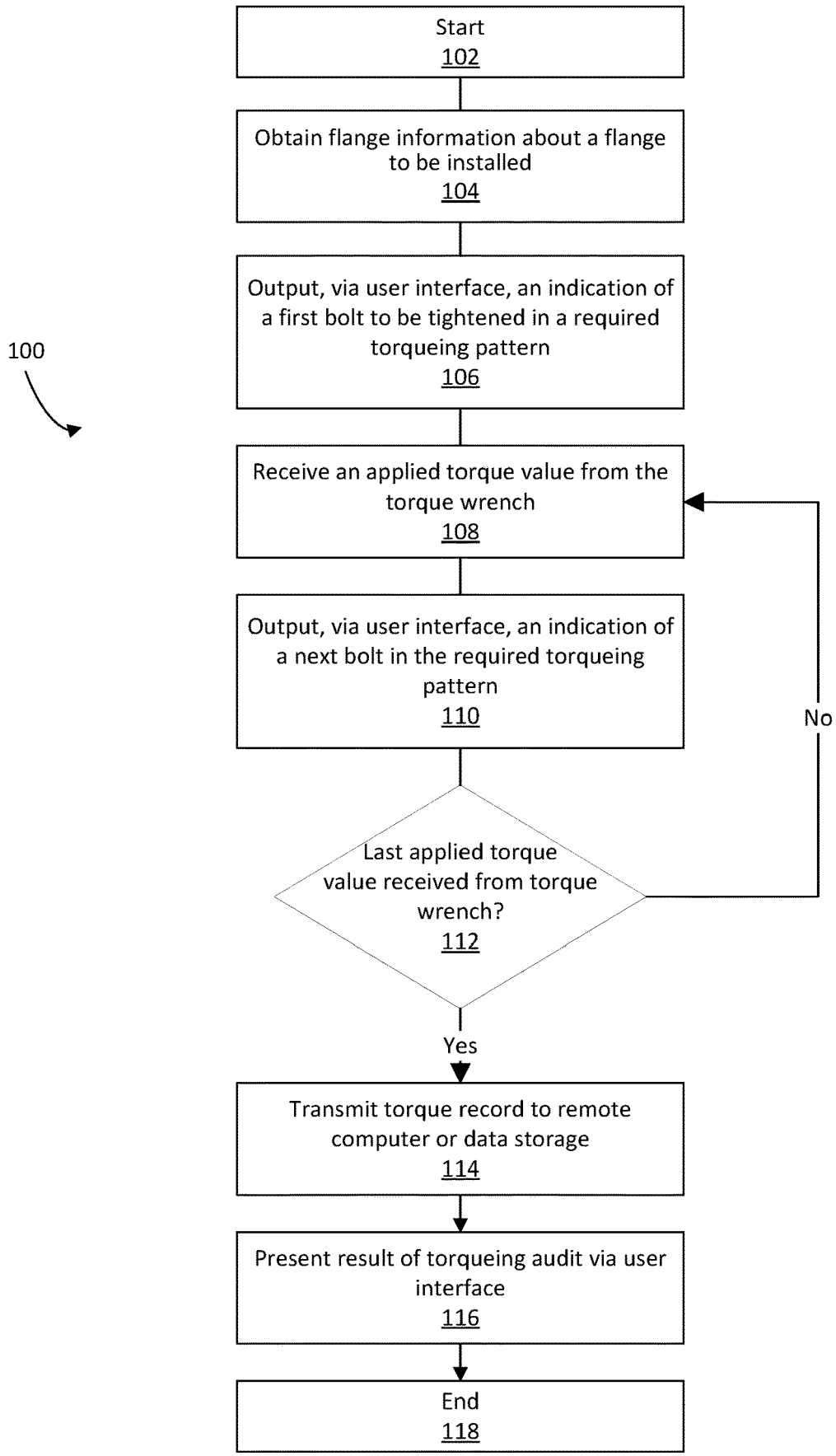

GUIDANCE DEVICE AND METHOD FOR INSTALLING FLANGES

CROSS-REFERENCE TO RELATED APPLICATIONS

This application claims the benefit under 35 U.S.C. § 121 as a divisional application of pending U.S. patent application Ser. No. 15/248,415, filed Aug. 26, 2016, titled "GUIDANCE DEVICE AND METHOD FOR INSTALLING FLANGES," which application is hereby incorporated herein by reference in its entirety.

TECHNICAL FIELD

The present disclosure relates to a guidance device and method for installing flanges by fastening a plurality of bolts.

BACKGROUND

On large industrial construction sites, e.g. chemical plants, refineries, oil and gas facilities, LNG facilities, the installation of a large number of flanges with multiple bolts is required. In order for the site to operate safely, the bolts are to be fastened by applying a sufficient amount of torque in a predetermined torqueing pattern. This is a time and money consuming process.

It is desired that a permanent record is stored, for instance for quality audit sessions. Therefore, the bolting process, executed by a worker, is often witnessed by an inspector to ensure that such a permanent record is developed in the form of a written record.

This further contributes to the time and costs, in particular since inspectors may not always be available, thereby delaying the bolting process.

U.S. Pat. No. 7,984,657 discloses a wireless-enabled tightening system for fasteners. The system includes a visual designator configured to project an indicator onto a work piece. The system also includes a torque wrench comprising a wireless transmitter and a means for identifying whether the correct torque has been applied to a fastener on the work piece and configured to provide a feedback for a user. The system also includes a camera configured to capture an image of the work piece when an appropriate amount of torque has been applied to the fastener. The system further includes a microprocessor for determining sequence of the fastener and identifying the tightened fastener.

The system of U.S. Pat. No. 7,984,657 requires a camera configured to capture an image of the work piece during the entire installing process and a visual designator, which are both not very practical on a large industrial construction sites. Also, U.S. Pat. No. 7,984,657 requires significant processing power necessary to compare image and significant network bandwidth to transmit image data files. Furthermore, the functioning of U.S. Pat. No. 7,984,657 relies on a "known environment", which isn't always available.

Reference is further made to US2014/0336810A1, GB2514264A, CN204818666U, JP2015196231, WO201434194, WO201399373, JP2011240425, KR20110054491, WO201128362, US20110023280 and JP2000111450.

SUMMARY

It is an objective to provide an improved system and method for installing flanges by fastening a plurality of bolts.

The present disclosure provides a guidance device for guiding a worker through a process of installing flanges by fastening a plurality of bolts with a torque wrench, the guidance device is arranged to communicate with the torque wrench and is arranged to communicate with the worker via a user interface, the guidance device being further arranged to a) obtain flange information about a flange to be installed, the flange information comprising an amount of bolts to be torqued, a required torqueing pattern of the bolts to be fastened and required torque values to be applied to the respective bolts in the required torqueing pattern, b) output via the user interface of an indication of a first bolt of the required torqueing pattern and optionally the required torque value associated with the first bolt, c) receive an applied torque value from the torque wrench, d) output via the user interface an indication of the next bolt of the required torqueing pattern and optionally the required torque value associated with the next bolt, repeat c) and d) until a last applied torque value associated with the last bolt to be torqued according to the required torqueing pattern is received from the torque wrench and e) transmit a torque record to a remote computer or data storage, the torque record comprising applied torque values associated with the flange and an indication of the order in which the torque values have been applied.

According to a further aspect, there is provided a method for guiding a worker through a process of installing flanges by fastening a plurality of bolts with a torque wrench, the method being performed by a guidance device being arranged to communicate with the torque wrench and the worker via a user interface, the method comprising execution of the following by the guidance device:

a) obtaining flange information about a flange to be installed, the flange information comprising an amount of bolts to be torqued, a required torqueing pattern of the bolts to be fastened and required torque values to be applied to the respective bolts in the required torqueing pattern, b) outputting via the user interface of an indication of a first bolt of the required torqueing pattern and optionally the required torque value associated with the first bolt, c) receiving an applied torque value from the torque wrench, d) outputting via the user interface of an indication of a next bolt of the required torqueing pattern and optionally the required torque value associated with the next bolt, repeating c) and d) until a last applied torque value is received from the torque wrench and e) transmitting a torque record to a remote computer or data storage, the torque record comprising applied torque values associated with the flange and an indication of the order in which the torque values have been applied.

The guidance device and method provide the advantage that installation of flanges by fastening a plurality of bolts can be done in a relatively quick manner, without compromising on the quality of the installation process.

Direct torqueing audits can be carried out from a remote location by an off-site inspector, who can quickly review and sign off. Also on site audits can be planned quickly. This all contributes to improved efficiency, as errors can be detected and corrected quickly, while the worker is still nearby. This way, a worker can receive feedback about his/her work quickly, preventing the worker from repeating the error.

As workers are guided through the process of installing flanges training is re-inforced.

Use of the method and guidance device further enhances the quality of work by codifying the approved flange tightening process for instance in the guidance device.

Furthermore, automatic and reliable record keeping is ensured. This allows for torqueing audits being conducted later in time, for instance in case of a failure of the flange.

BRIEF DESCRIPTION OF THE DRAWINGS

Various aspects of at least one example are discussed below with reference to the accompanying FIGURE, which is not intended to be drawn to scale. The FIGURE is included to provide an illustration and a further understanding of the various aspects and examples, and is incorporated in and constitute a part of this specification, but is not intended as a definition of the limits of a particular example.

FIG. 1 depicts a process for guiding a worker through a process of installing flanges according to some embodiments.

DETAILED DESCRIPTION

As indicated there is provided a guidance device or assisting device for guiding or assisting a worker through the process of installing flanges by fastening a plurality of bolts with a torque wrench.

The guidance device is arranged to communicate with the torque wrench, preferably wirelessly, and is further arranged to provide information to the worker via a user interface, preferably a display.

The guidance device is preferably a computer device, and more preferably a mobile computer device, such as a handheld computer device. The term mobile computer device is used here to refer to a computer device that can function without being connected to wires and can be carried by a person.

The guidance device typically comprises a processor and a memory unit, the memory unit comprising instruction lines readable and executable by the processor to provide the computer with the required functionality as explained in this text. The guidance device further comprises an input/output unit to enable the guidance device to communicate with remote devices, such as the torque wrench and remote computers. As indicated, the guidance device further comprises a user interface to output information to a user and receive user feedback and/or instructions.

The guidance device is arranged to a) obtain flange information about a flange to be installed, the flange information comprising an amount of bolts to be torqued, a required torqueing pattern of the bolts to be fastened and required torque values to be applied to the respective bolts in the required torqueing pattern.

The flange information may comprise an amount of bolts to be torqued, for instance 2, 4, 8, . . . 64 bolts. The flange information further comprises a required torqueing pattern of the bolts to be fastened and required torque values to be applied to the respective bolts. The torque pattern may prescribe to apply torque to a bolt more than once, wherein the amount of torque to be applied increases.

The flange information may be obtained in any suitable manner According to an embodiment, the flange information is obtained by first obtaining flange indicator by reading in a digital work plan comprising a plurality of flanges to be installed, the order in which the flanges are to be installed and associated flange indicators, or scanning a flange indicator attached to the flange, such as scanning a RFID code or visual code, e.g. a barcode, using a scanner or camera associated with the guidance device or capturing an image of the flange using a camera associated with the mobile computer device and apply pattern recognition techniques to obtain the flange indicator or obtaining the flange indicator by manual input via the user interface, and subsequently obtaining the flange information from a flange information database by using the flange indicator.

The flange information database may be stored in the memory unit of the computer device or may be stored on a remote computer to which the computer device has access.

The flange information database comprises a plurality of flange indicators and associated flange information. The flange indicator may be a flange ID, unique for a specific flange or for a type of flange. The flange information may be obtained through the flange information database using the flange indicator as entry.

According to an embodiment, subsequently obtaining the flange information from a flange information database by using the flange indicator is done by looking up the amount of bolts of the flange associated with the flange indicator in the flange information database and subsequently, looking up the required torqueing pattern for the amount of bolts in the flange information database.

The flange information database may comprise or have access to pre-defined torqueing pattern templates for specific types of flanges. The flange information database can be customized and loaded with new data for any required bolt pattern, number of bolts or industry standard.

The guidance device is further arranged to b) output via the user interface an indication of a first bolt of the required torqueing pattern and optionally the required torque value associated with the first bolt.

As explained in more detail below, the required torque value may also be directly communicated to the torque wrench, in which case the worker may not have to be provided with information of the required torque value via the user interface.

In response to the information provided via the user interface, the worker may use the torque wrench to apply the required torque value on the first bolt.

The torque wrench may be any torque wrench suitable for recording an actual applied torque value and transmitting the applied torque value.

The torque wrench may comprise a head that is arranged to apply torque to a bolt and a handle attached to the head allowing a user to handle and position the torque wrench.

The torque wrench may be arranged to record an applied torque value. The torque wrench may be a manually activated torque wrench or a machine activated torque wrench, such as a hydraulically activated torque wrench.

The torque wrench may be arranged to be set to a predetermined torque value.

According to an embodiment, the torque wrench may be a digital torque wrench, i.e. a torque wrench that includes a digital sensor that outputs the amount of torque being applied when tightening a fastener such as a nut or a bolt.

The torque wrench may further be arranged to provide a user with feedback when the required torque value is applied, for instance by a warning signal.

The transmitter may be a wireless transmitter.

Next, the guidance device is arranged to c) receive an applied torque value from the torque wrench.

This is done in response to the torque wrench transmitting the applied torque value.

After having received the applied torque value, the guidance device is arranged to d) output via the user interface an indication of a next bolt of the required torqueing pattern and optionally the required torque value associated with the next bolt.

According to an embodiment, the guidance device is arranged to b') output the required torque value associated with the first bolt to the torque wrench, and d') output the required torque value associated with the next bolt to the torque wrench.

This has the advantage that the torque wrench can automatically set the required torque. Depending on the torque wrench used, the torque wrench may apply the required torque when prompted by the worker or can provide user feedback to the worker when the worker has applied sufficient torque. According to such an embodiment, it may not be necessary to output the required torque value via the user interface.

According to an embodiment outputting via the user interface of an indication of the next bolt of the required torqueing pattern is done by providing a visual representation of the bolts, wherein the next bolt of the required torqueing pattern is represented differently than the other bolts.

The guidance device may be arranged to provide a visual representation of the bolts and the sequence in which the bolts are to be torqued.

The guidance device is arranged to repeat c) and d) until a last applied torque value associated with the last bolt to be torqued according to the required torqueing pattern is received from the torque wrench.

As a next step, the guidance device is arranged to e) transmit a torque record to a remote computer or data storage, the torque record comprising applied torque values associated with the flange and an indication of the order in which the torque values have been applied.

The data storage may be a data cloud, being a data storage which is wirelessly accessible by a plurality of computers.

According to an embodiment, the guidance device is arranged to transmit the torque record to the remote computer directly after the last applied torque value is received.

The term directly after is used here to indicate that the torque record is transmitted as soon as the torque record is completed and available for transmission. In practice, the torque record is transmitted within 8, 4 or 2 hours, preferably within 5 minutes, more preferably within 1 minute or most preferably within seconds, from receiving the last applied torque value. This allows for torqueing audits to be carried out from a remote location directly.

The torque record is stored in the remote computer to allow for an (off-site) inspector to quickly review and sign off on a report to testify the bolt and flange have been fastened in line with procedure. The record may also serve as a means for permanent record of the bolt and flange installation.

The guidance device and the torque wrench may be embedded in a single housing, but according to a preferred embodiment the guidance device and the torque wrench are in different housings. This provides a flexible guidance device that is capable of interacting with a variety of torque wrenches.

The person skilled in the art will understand that the present disclosure can be carried out in various ways without departing from the scope of the appended claims.

EXAMPLES

According to a further aspect, and as seen in FIG. 1, there is provided a method 100 for guiding a worker through an installation process using a guidance device.

At act 102, the method beings.

At act 104, flange information is obtained, via an input/output unit of the guidance device, about a flange to be installed, the flange information comprising a required torqueing pattern of bolts to be torqued and required torque values to be applied to the bolts in the required torqueing pattern.

At act 106, an indication of a first bolt in the bolts in the required torqueing pattern is output via a user interface of the guidance device.

At act 108, an applied torque value from the torque wrench is received via the input/output unit.

At act 110, an indication of a next bolt of the required torqueing pattern is output via the user interface.

At act 112, acts 108 and 110 are repeated until a last applied torque value for the flange is received from the torque wrench.

At act 114, upon determining that the last applied torque value for the flange has been received from the torque wrench, a torque record is transmitted to a data storage at a remote location, the torque record comprising applied torque values associated with the flange and an indication of the order in which the torque values were applied.

At act 116, a result of a direct torqueing audit is presented via the user interface.

At act 118, the method ends.

1. A guidance device for guiding a worker through a process of installing flanges by fastening a plurality of bolts with a torque wrench, the guidance device is arranged to communicate with the torque wrench and is arranged to communicate with the worker via a user interface, the guidance device being further arranged to a) obtain flange information about a flange to be installed, the flange information comprising an amount of bolts to be torqued, a required torqueing pattern of the bolts to be fastened and required torque values to be applied to the respective bolts in the required torqueing pattern, b) output via the user interface of an indication of a first bolt of the required torqueing pattern and optionally the required torque value associated with the first bolt, c) receive an applied torque value from the torque wrench, d) output via the user interface of an indication of a next bolt of the required torqueing pattern and optionally the required torque value associated with the next bolt, repeat c) and d) until a last applied torque value is received from the torque wrench and e) transmit a torque record to a remote computer or data storage, the torque record comprising applied torque values associated with the flange and an indication of the order in which the torque values have been applied.

2. Guidance device according to example 1, wherein the flange information is obtained by first obtaining a flange indicator by reading in a digital work plan comprising a plurality of flanges to be installed, the order in which the flanges are to be installed and associated flange indicators, or scanning a flange indicator attached to the flange, such as scanning a RFID code or visual code, e.g. a barcode, using a scanner or camera associated with the guidance device or capturing an image of the flange using a camera associated with the guidance device and apply pattern recognition techniques to obtain the flange indicator or obtaining the flange indicator by manual input via the user interface, and subsequently obtaining the flange information from a flange information database by using the flange indicator.

3. Guidance device according to example 2, wherein subsequently obtaining the flange information from a flange information database by using the flange indicator is done by—looking up the amount of bolts of the flange associated with the flange indicator in the flange information database and subsequently, looking up the required torqueing pattern for the amount of bolts in the flange information database.

4. Guidance device according to any one of the preceding examples, wherein the guidance device is arranged to transmit the torque record to the remote computer directly after the last applied torque value is received.

5. Guidance device according to any one of the preceding examples, wherein the guidance device and the torque wrench are arranged to communicate wirelessly.

6. Guidance device according to any one of the preceding examples, wherein outputting via the user interface of an indication of the next bolt of the required torqueing pattern is done by providing a visual representation of the bolts, wherein the next bolt of the required torqueing pattern is represented differently than the other bolts.

7. Guidance device according to any one of the preceding examples, wherein the guidance device is arranged to b') output the required torque value associated with the first bolt to the torque wrench, and d') output the required torque value associated with the next bolt to the torque wrench.

8. Method for guiding a worker through a process of installing flanges by fastening a plurality of bolts with a torque wrench, the method being performed by a guidance device being arranged to communicate with the torque wrench and the worker via a user interface, the method comprising execution of the following by the guidance device:

a) obtaining flange information about a flange to be installed, the flange information comprising an amount of bolts to be torqued, a required torqueing pattern of the bolts to be fastened and required torque values to be applied to the respective bolts in the required torqueing pattern, b) outputting via the user interface of an indication of a first bolt of the required torqueing pattern and optionally the required torque value associated with the first bolt, c) receiving an applied torque value from the torque wrench, d) outputting via the user interface of an indication of a next bolt of the required torqueing pattern and optionally the required torque value associated with the next bolt, repeating c) and d) until a last applied torque value is received from the torque wrench and e) transmitting a torque record to a remote computer or data storage, the torque record comprising applied torque values associated with the flange and an indication of the order in which the torque values have been applied.

What is claimed is:

1. A method for guiding a worker through an installation process using a guidance device, the method comprising:

obtaining, via an input/output unit of the guidance device, flange information about a flange to be installed, the flange information comprising a required torqueing pattern of bolts to be torqued and required torque values to be applied to the bolts in the required torqueing pattern;

outputting, via a user interface of the guidance device, an indication of a first bolt in the bolts in the required torqueing pattern;

receiving, via the input/output unit, an applied torque value from the torque wrench;

outputting, via the user interface, an indication of a next bolt of the required torqueing pattern;

repeating the steps of receiving the applied torque value and outputting the indication of the next bolt until a last applied torque value for the flange is received from the torque wrench; and upon determining that the last applied torque value for the flange has been received from the torque wrench, transmitting a torque record to a data storage at a remote location, the torque record comprising applied torque values associated with the flange and an indication of the order in which the torque values were applied; and presenting, via the user interface, a result of a direct torqueing audit.

2. The method of claim 1, further comprising:

obtaining a flange indicator by at least one of (i) reading in a digital work plan comprising a plurality of flanges to be installed, the order in which the flanges are to be installed, and associated flange indicators, and (ii) scanning a flange indicator attached to the flange.

3. The method of claim 2, wherein the flange indicator is at least one of an RFID code and a barcode, further comprising capturing the flange indicator with one of a camera and a scanner.

4. The method of claim 2, further comprising obtaining the flange information from a flange information database with reference to the flange indicator.

5. The method of claim 1, wherein the guidance device is configured to transmit the torque record to the remote computer immediately after the last applied torque value is received.

6. The method of claim 1, further comprising providing, via the user interface, a visual representation of the bolts in the required torqueing pattern, wherein the next bolt of the required torqueing pattern is represented differently than the other bolts.

7. The method of claim 1, further comprising:

transmitting the required torque value associated with the first bolt to the torque wrench; and transmitting the required torque value associated with the next bolt to the torque wrench.

8. A method for facilitating guidance of a worker through a process of installing flanges using a guidance device, the method comprising:

providing a guidance device for use by the worker;

providing access to a flange information database of flange information about a flange to be installed, the flange information comprising a required torqueing pattern of bolts to be torqued and required torque values to be applied to the respective bolts in the required torqueing pattern;

receiving, at a remote computer, a torque record comprising applied torque values associated with the flange and an indication of the order in which the torque values were applied; and presenting information about the torque record during a direct torqueing audit.

\* \* \* \* \*